United States Patent
Go et al.

(10) Patent No.: US 12,408,114 B2
(45) Date of Patent: Sep. 2, 2025

(54) METHOD AND APPARATUS FOR TRANSMITTING AND RECEIVING UPLINK IN WIRELESS COMMUNICATION SYSTEM

(71) Applicant: LG ELECTRONICS INC., Seoul (KR)

(72) Inventors: Seongwon Go, Seoul (KR); Jaehoon Chung, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 491 days.

(21) Appl. No.: 17/800,882

(22) PCT Filed: Feb. 19, 2021

(86) PCT No.: PCT/KR2021/002108
§ 371 (c)(1),
(2) Date: Aug. 18, 2022

(87) PCT Pub. No.: WO2021/167390
PCT Pub. Date: Aug. 26, 2021

(65) Prior Publication Data
US 2023/0337142 A1    Oct. 19, 2023

(30) Foreign Application Priority Data

Feb. 20, 2020 (KR) .................. 10-2020-0021296

(51) Int. Cl.
*H04L 12/28* (2006.01)
*H04W 52/14* (2009.01)
*H04W 52/24* (2009.01)

(52) U.S. Cl.
CPC ....... *H04W 52/146* (2013.01); *H04W 52/242* (2013.01)

(58) Field of Classification Search
CPC .................. H04W 52/244; H04W 52/222
(Continued)

(56) References Cited

U.S. PATENT DOCUMENTS

2016/0157218 A1* 6/2016 Nam ............... H04B 7/0632
370/329
2019/0349867 A1   11/2019 Molavianjazi et al.
(Continued)

OTHER PUBLICATIONS

LG Electronics, "Feature lead summary #2 of Enhancements on Multi-beam Operations," 3GPP TSG-RAN WG1 Meeting #99, R1-1913322, Nov. 2019, 39 pages.
(Continued)

*Primary Examiner* — Dang T Ton
(74) *Attorney, Agent, or Firm* — LEE, HONG, DEGERMAN, KANG & WAIMEY

(57) ABSTRACT

Disclosed are a method and apparatus for transmitting and receiving an uplink in a wireless communication system. The method for transmitting an uplink according to an embodiment of the present disclosure may comprise the steps of: receiving, from a base station, configuration information associated with a pathloss reference signal (PL RS) of the uplink; receiving, from the base station, control information for updating a first PL RS; and transmitting the uplink to the base station, on the basis of an updated second PL RS. PL RSs for all uplinks that refer to the first PL RS may be updated to the second PL RS.

9 Claims, 15 Drawing Sheets

(58) Field of Classification Search
USPC .......................................... 370/329, 400, 395
See application file for complete search history.

(56) References Cited

U.S. PATENT DOCUMENTS

2021/0195530 A1* 6/2021 Venugopal ............ H04W 52/32
2022/0394626 A1* 12/2022 Matsumura ........... H04W 72/04

OTHER PUBLICATIONS

ASUSTeK, "Enhancements on multiple beam operation," 3GPP TSG-RAN WG1 #99, R1-1913021, Nov. 2019, 6 pages.
Ericsson, "Discussion on applicable timing for pathloss RS activated/updated by MAC-CE," 3GPP TSG-RAN WG4 Meeting #93, R4-1914360, Nov. 2019, 3 pages.
Qualcomm, "Applicable timing for pathloss RS activated/updated by MAC-CE," 3GPP TSG-RAN WG4 #93, R4-1914980, Nov. 2019, 5 pages.
PCT International Application No. PCT/KR2021/002108, International Search Report dated Jun. 15, 2021, 4 pages.
Korean Intellectual Property Office Application No. 10-2022-7028404, Office Action dated Dec. 13, 2024, 5 pages.
Nokia et al., "Enhancements on Multi-beam Operation," 3GPP TSG RAN WG1 #99, R1-1912720, Nov. 2019, 11 pages.
Ericsson, "Remaining issues on multi-beam enhancements," 3GPP TSG-RAN WG1 Meeting #99, Tdoc R1-1912058, Nov. 2019, 15 pages.

* cited by examiner (a)

(b)

METHOD AND APPARATUS FOR TRANSMITTING AND RECEIVING UPLINK IN WIRELESS COMMUNICATION SYSTEM

CROSS-REFERENCE TO RELATED APPLICATIONS

This application is the National Stage filing under 35 U.S.C. 371 of International Application No. PCT/KR2021/002108, filed on Feb. 19, 2021, which claims the benefit of earlier filing date and right of priority to Korean Application No. 10-2020-0021296, filed on Feb. 20, 2020, the contents of which are all incorporated by reference herein in their entirety.

TECHNICAL FIELD

The present disclosure relates to a wireless communication system, and in more detail, relates to a method and an apparatus of transmitting and receiving an uplink in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving an uplink channel and/or signal.

In addition, an additional technical object of the present disclosure is to provide a method and an apparatus for updating a path loss reference signal for an uplink channel and/or signal.

In addition, an additional technical object of the present disclosure is to provide a method and an apparatus for transmitting and receiving an uplink channel and/or a signal based on an updated path loss reference signal.

The technical objects to be achieved by the present disclosure are not limited to the above-described technical objects, and other technical objects which are not described herein will be clearly understood by those skilled in the pertinent art from the following description.

Technical Solution

A method of transmitting an uplink in a wireless communication system according to an aspect of the present disclosure may include: receiving, from a base station, configuration information related to a pathloss reference signal (PL RS); receiving, from the base station, control information for updating a first PL RS; and transmitting, to the base station, an uplink based on the updated second PL RS. PL RSs for all uplinks referring to the first PL RS may be updated to the second PL RS.

A terminal transmitting an uplink according to an additional aspect of the present disclosure may include at least one transceiver for transmitting and receiving a wireless signal and at least one processor controlling the at least one transceiver. The at least one processor may be configured to: receive, from a base station, configuration information related to a pathloss reference signal (PL RS); receive, from the base station, control information for updating a first PL RS; and transmit, to the base station, an uplink based on the updated second PL RS. PL RSs for all uplinks referring to the first PL RS may be updated to the second PL RS.

In at least one non-transitory computer-readable medium storing at least one instruction, the at least one instruction executable by at least one processor may control a device to: receive, from a base station, configuration information related to a pathloss reference signal (PL RS); receive, from the base station, control information for updating a first PL RS; and transmit, to the base station, an uplink based on the updated second PL RS. PL RSs for all uplinks referring to the first PL RS may be updated to the second PL RS.

A processing apparatus configured to control a terminal for transmitting an uplink in a wireless communication system may include at least one processor; and at least one computer memory operably connected to the at least one processor and storing instructions that, based on being executed by the at least one processor, perform operations. The operations may include: receiving, from a base station, configuration information related to a pathloss reference signal (PL RS); receiving, from the base station, control information for updating a first PL RS; and transmitting, to the base station, an uplink based on the updated second PL RS. PL RSs for all uplinks referring to the first PL RS may be updated to the second PL RS.

Preferably, the control information may be control information for a specific uplink, and PL RSs for all uplinks including the specific uplink referring to the first PL RS may be updated to the second PL RS.

Preferably, when all PL RSs previously activated for the terminal are equal to a maximum number according to capability of the terminal, PL RSs for all uplinks referring to the first PL RS may be updated to the second PL RS.

Preferably, when all PL RSs previously activated for the terminal are less than a maximum number according to capability of the terminal, PL RSs for all uplinks referring to the first PL RS may be updated to the second PL RS.

Preferably, when the control information indicates to be updated to a PL RS other than all PL RSs previously activated for the terminal, PL RSs for all uplinks referring to the first PL RS may be updated to the second PL RS.

Preferably, uplink transmission power may be determined based on a pathloss value estimated based on the second PL RS.

Advantageous Effects

According to an embodiment of the present disclosure, since the number of path loss reference signals that a terminal can track at the same time is not exceeded, ambiguity of an operation of a terminal can be prevented.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
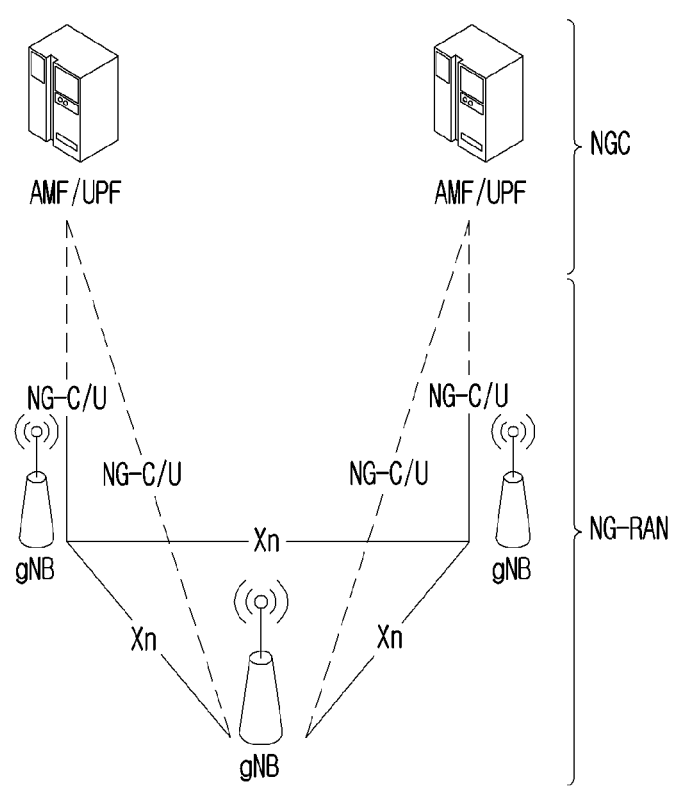
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
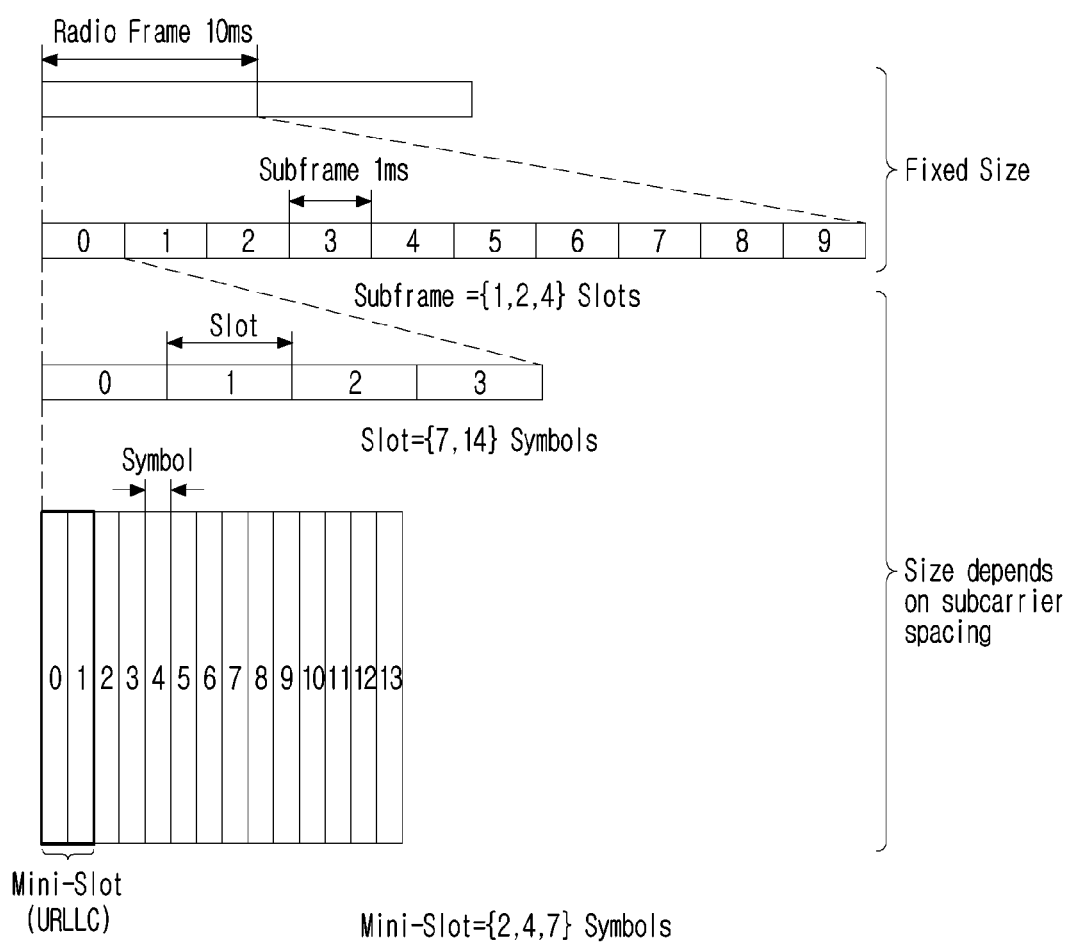
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480.103 Hz and $N_f$ is 4096. Downlink and uplink transmission is configured (organized) with a radio frame having a duration of $T_f = 1/(\Delta f_{max} \cdot N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset}) \cdot T_c$ than a corresponding downlink frame in a corresponding terminal starts. For a subcarrier spacing configuration p, slots are numbered in an increasing order of $n_s^\mu \in \{0, \ldots, N_{slot}^{subframe,\mu} - 1\}$ in a subframe and are numbered in an increasing order of $n_{s,f}^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
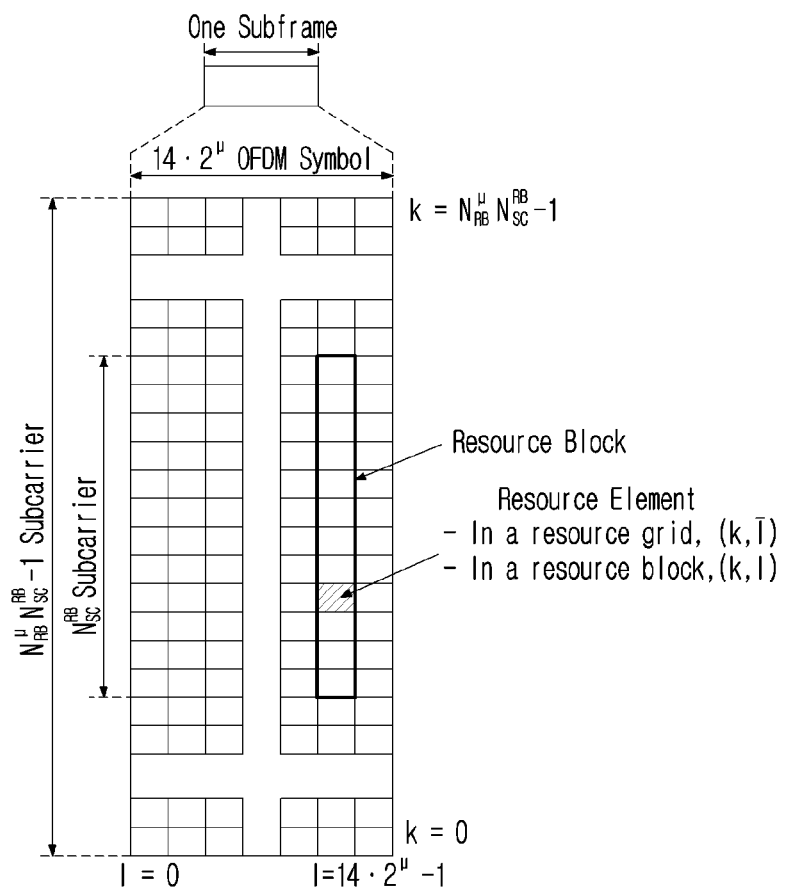
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14.2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k, l'). Here, k=0, . . . , $N_{RB}^{\mu} N_{sc}^{RB}-1$ is an index in a frequency domain and l'=0, . . . , $2^{\mu} N_{symb}^{(\mu)}-1$ refers to a position of a symbol in a subframe. When referring to a resource element in a slot, an index pair (k, l) is used. Here, l=0, . . . , $N_{symb}^{\mu}-1$. A resource element (k, l') for p and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration p. The center of subcarrier 0 of common resource block 0 for a subcarrier spacing configuration p is identical to 'point A'. A relationship between a common resource block number $n_{CRB}^{\mu}$ and a resource element (k, l) for a subcarrier spacing configuration p in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{sized-\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
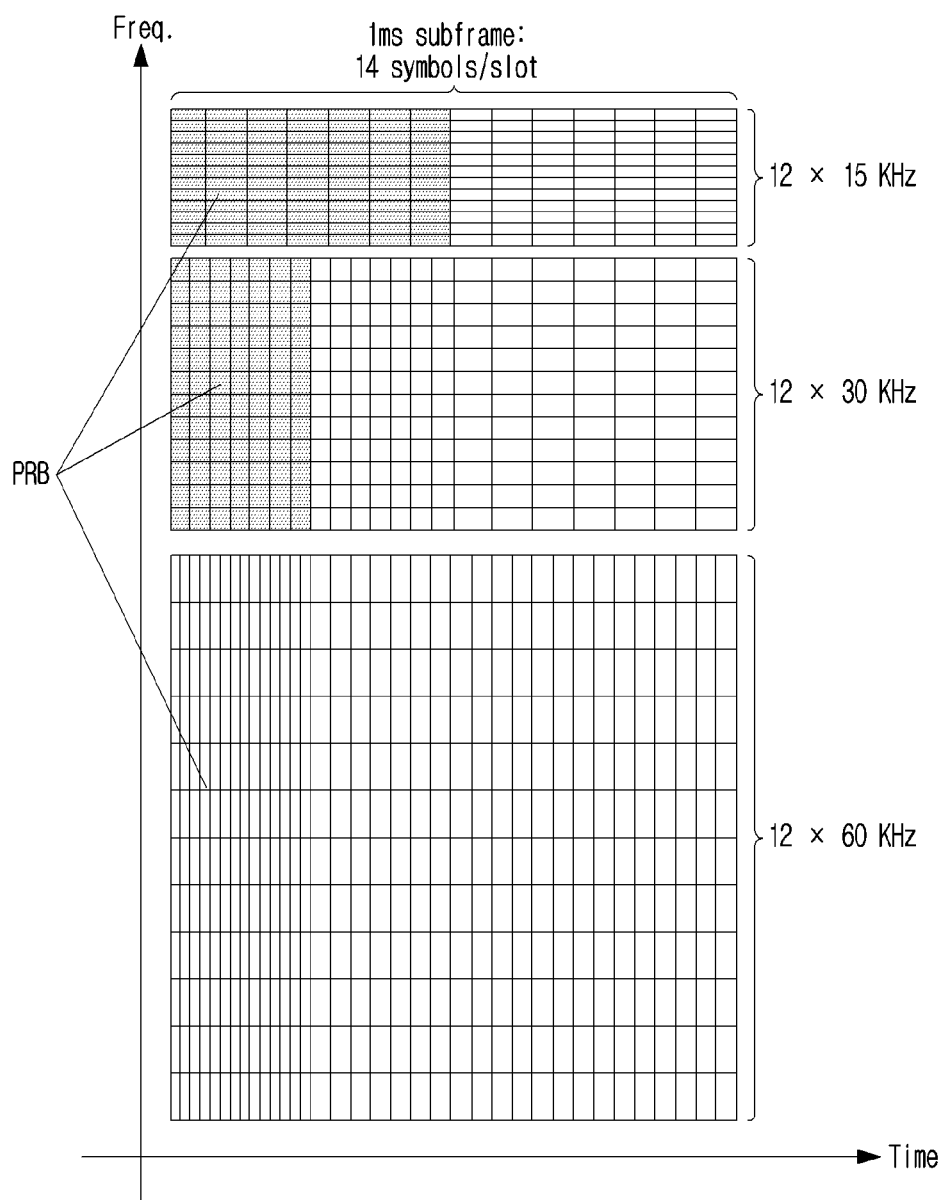
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
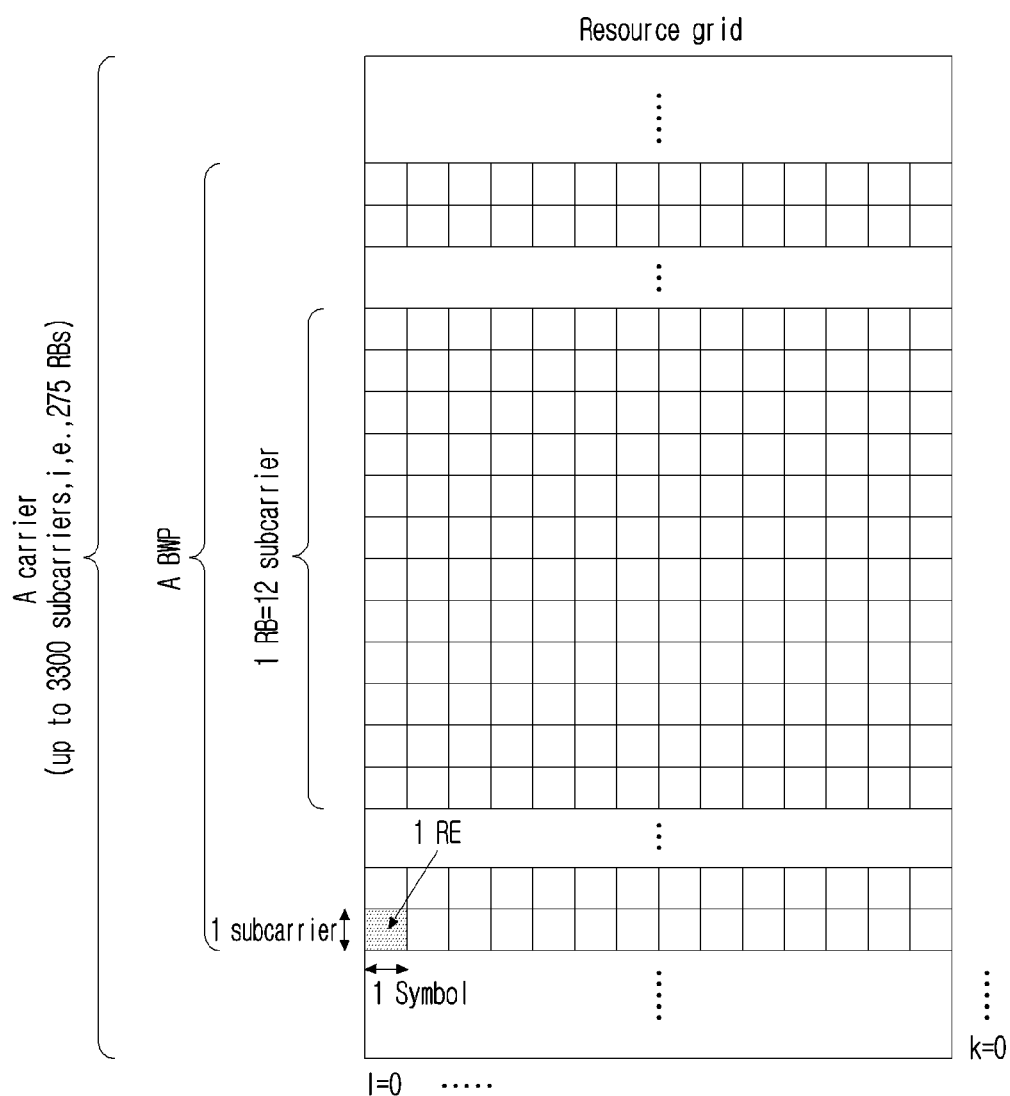
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
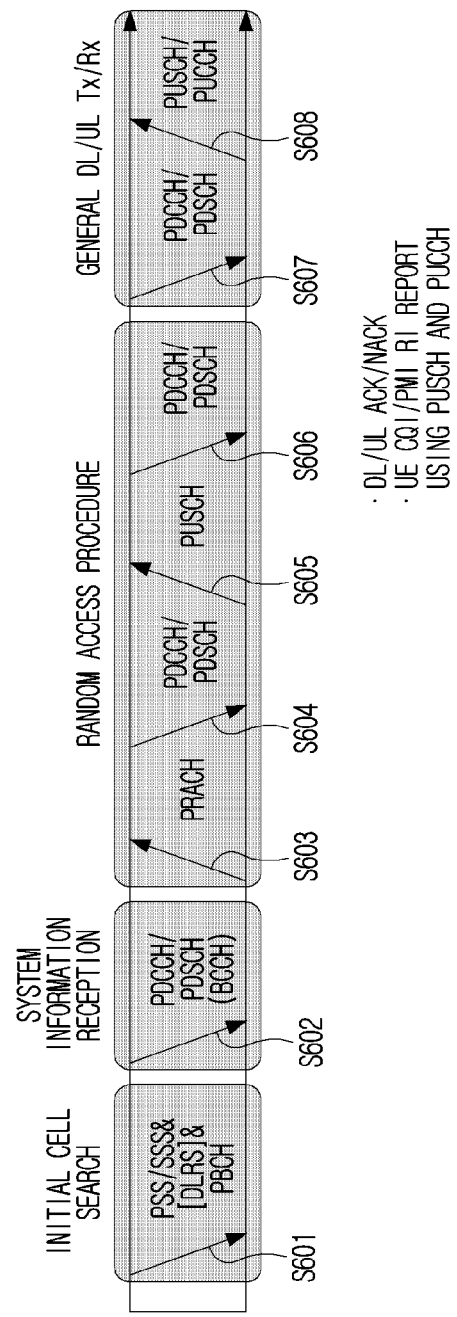
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Uplink Power Control

In a wireless communication system, it may be necessary to increase or decrease transmission power of a terminal (e.g., User Equipment, UE) and/or a mobile device according to circumstances. In this way, controlling the transmission power of a terminal and/or a mobile device may be referred to as uplink power control. As an example, a transmission power control method may be applied to satisfy a requirement (e.g., Signal-to-Noise Ratio (SNR), Bit Error Ratio (BER), Block Error Ratio (BLER)) etc.) of a base station (e.g., gNB, eNB, etc.).

Power control as described above may be performed in an open-loop power control scheme and a closed-loop power control scheme.

Specifically, an open-loop power control method means a method of controlling transmission power without feedback from a transmitting device (e.g., a base station, etc.) to a receiving device (e.g., a terminal, etc.) and/or feedback from a receiving device to a transmitting device. For example, a terminal may receive a specific channel/signal from a base station, and may estimate strength of the received power using that. Thereafter, a terminal may control transmission power using the estimated strength of the received power.

In contrast, a closed-loop power control method means a method of controlling transmission power based on feedback from a transmitting device to a receiving device and/or feedback from a receiving device to a transmitting device. For example, a base station receives a specific channel/signal from a terminal, and determines an optimal power level of a terminal based on the power level, SNR, BER, BLER, etc. measured by the received specific channel/signal. A base station transmits information (i.e., feedback) on the determined optimal power level to a terminal through a control channel, etc., and a terminal may control transmission power using the feedback provided by a base station.

Hereinafter, a power control method for cases in which a terminal and/or a mobile device perform uplink transmission to a base station in a wireless communication system will be described in detail.

Specifically, power control methods for transmission of 1) an uplink data channel (e.g., a Physical Uplink Shared Channel (PUSCH)), 2) an uplink control channel (e.g., Physical Uplink Control Channel (PUCCH)), 3) a Sounding Reference Signal (SRS), 4) a random access channel (e.g., physical random access channel (PRACH)) will be described below. Here, a transmission occasion (i.e., a transmission time unit) (i) for a PUSCH, a PUCCH, an SRS and/or a PRACH may be defined by a slot index (n s) within a frame of a system frame number (SFN), the first symbol (S) in a slot, the number of consecutive symbols (L), etc.

Hereinafter, for convenience of description, a power control method will be described based on a case in which a terminal performs PUSCH transmission. The method may be extended and applied to other uplink data channels supported in a wireless communication system.

In the case of PUSCH transmission in an active uplink bandwidth part (UL BWP) of a carrier (f) of a serving cell (c), a terminal may calculate a linear power value of transmission power determined by Equation 3 below. Thereafter, the corresponding terminal may control the transmission power by taking the calculated linear power value into consideration, such as the number of antenna ports and/or the number of SRS ports.

Specifically, by using a parameter set configuration based on index j and a PUSCH power control adjustment state based on index 1, when a terminal performs PUSCH transmission in an activated UL BWP (b) of a carrier (f) of a serving cell (c), the terminal may determine PUSCH transmission power $P_{PUSCH,b,f,c}(i, j, q_d, l)$ (dBm) at a PUSCH transmission occasion (i) based on Equation 3 below.

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + \\ f_{b,f,c}(i, l) \end{Bmatrix}$$

[Equation 3]

In Equation 3, index j represents an index for an open-loop power control parameter (e.g., $P_o$, $\alpha$ (alpha), etc.), and a maximum of 32 parameter sets per cell may be configured. Index q_d represents an index of a DL RS resource for a path loss (PL) measurement (e.g., $PL_{b,f,c}(q_d)$), and up to four measurements may be configured per cell. Index 1 represents an index for a closed-loop power control process, and a maximum of two processes per cell may be configured.

Specifically, $P_o$ (e.g., $P_{O\_PUSCH,b,f,c}(j)$) is a parameter broadcast as part of system information, and may indicate a target reception power at a receiving side. The corresponding $P_o$ value may be configured in consideration of throughput of a terminal, capacity of a cell, noise and/or interference, etc. In addition, alpha (e.g., $\alpha_{b,f,c}(j)$) may represent a rate at which compensation for path loss is performed. Alpha may be configured to a value from 0 to 1, and full pathloss compensation or fractional pathloss compensation may be performed according to the set value. In this case, the alpha value may be configured in consideration of interference between terminals and/or data rate. In addition, $P_{CMAX,f,c}(i)$ may represent a configured UE transmit power. For example, the configured terminal transmission power may be interpreted as 'configured maximum UE output power' defined in 3GPP TS 38.101-1 and/or TS 38.101-2. In addition, $M_{RB, b, f, c}^{PUSCH}(i)$ may represent a bandwidth of PUSCH resource allocation expressed by the number of resource blocks (RBs) for a PUSCH transmission occasion based on subcarrier spacing (p). In addition, $f_{b,f,c}(i, l)$ related to a PUSCH power control adjustment state may be configured or indicated based on a TPC command field of DCI (e.g., DCI format 0_0, DCI format 0_1, DCI format 2_2, DCI format2_3, etc.).

In this case, a specific RRC (Radio Resource Control) parameter (e.g., SRI-PUSCHPowerControl-Mapping, etc.) may represent a linkage between an SRI (SRS Resource Indicator) field of DCI (downlink control information) and the above-mentioned indexes j, q_d, 1. In other words, the aforementioned indexes j, l, q_d, etc. may be associated with a beam, a panel, and/or a spatial domain transmission filter, etc. based on specific information. Through this, PUSCH transmission power control in units of beams, panels, and/or spatial domain transmission filters may be performed.

The above-described parameters and/or information for PUSCH power control may be individually (i.e., independently) configured for each BWP. In this case, corresponding parameters and/or information may be configured or indicated through higher layer signaling (e.g., RRC signaling, Medium Access Control-Control Element (MAC-CE), etc.) and/or DCI. As an example, parameters and/or information for PUSCH power control may be transmitted through RRC signaling PUSCH-ConfigCommon, PUSCH-PowerControl, etc., and PUSCH-ConfigCommon and PUSCH-PowerControl may be configured as shown in Table 6 below.

Specifically, $P_o$ (e.g., $P_{O\_PUCCH,b,f,c}(q_u)$) is a parameter broadcast as part of system information, and may represent a target reception power at a receiving side. The corresponding $P_o$ value may be configured in consideration of a throughput of a terminal, capacity of a cell, noise and/or interference, etc. In addition, $P_{CMAX,f,c}(i)$ may represent the configured terminal transmission power. For example, the configured terminal transmission power may be interpreted as 'configured maximum UE output power' defined in 3GPP

TABLE 6

| PUSCH-ConfigCommon ::= | SEQUENCE { |
|---|---|
| groupHoppingEnabledTransformPrecoding | ENUMERATED {enabled} |
| pusch-TimeDomainAllocationList | PUSCH-TimeDomainResourceAllocationList |
| msg3-DeltaPreamble | INTEGER (-1..6) |
| p0-NominalWithGrant | INTEGER (-202..24) |
| ... | |
| } | |
| PUSCH-PowerControl ::= | SEQUENCE { |
| tpc-Accumulation | ENUMERATED { disabled } |
| msg3-Alpha | Alpha |
| p0-NominalWithoutGrant | INTEGER (-202..24) |
| p0-AlphaSets | SEQUENCE (SIZE (1..maxNrofP0-PUSCH-AlphaSets)) OF P0-PUSCH-AlphaSet |
| pathlossReferenceRSToAddModList | SEQUENCE (SIZE (1..maxNrofPUSCH-PathlossReferenceRSs)) OF PUSCH-PathlossReferenceRS |
| pathlossReferenceRSToReleaseList | SEQUENCE (SIZE (1..maxNrofPUSCH-PathlossReferenceRSs)) OF PUSCH-PathlossReferenceRS-Id |
| twoPUSCH-PC-AdjustmentStates | ENUMERATED {twoStates} |
| deltaMCS | ENUMERATED {enabled} |
| sri-PUSCH-MappingToAddModList | SEQUENCE (SIZE (1..maxNrofSRI-PUSCH-Mappings)) OF SRI-PUSCH-PowerControl |
| sri-PUSCH-MappingToReleaseList | SEQUENCE (SIZE (1..maxNrofSRI-PUSCH-Mappings)) OF SRI-PUSCH-PowerControlId |
| } | |

Through the method as described above, a terminal may determine or calculate PUSCH transmission power, and may transmit a PUSCH using the determined or calculated PUSCH transmission power.

Hereinafter, for convenience of description, a power control method will be described based on a case in which a terminal performs PUCCH transmission. The method may be extended and applied to other uplink control channels supported in a wireless communication system.

Specifically, by using a PUCCH power control adjustment state based on index l, when a terminal performs PUCCH transmission in an activated UL BWP (b) of a carrier (f) of a primary cell (or secondary cell) (c), a terminal may determine PUCCH transmission power $P_{PUCCH,b,f,c}$ (i, $q_u$, $q_d$, l) (dBm) at a PUCCH transmission occasion (i) based on Equation 4 below.

[Equation 4]

$$P_{PUCCH,b,f,c}(i, q_u, q_d, l) = \min\begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + \\ g_{b,f,c}(i, l) \end{cases}$$

In Equation 4, q_u represents an index for an open-loop power control parameter (e.g., $P_o$, etc.), and a maximum of 8 parameter values per cell may be configured. Index q_d represents an index of a DL RS resource for a path loss (PL) measurement (e.g., $PL_{b,f,c}$ ($q_d$)), and a maximum of four measurements may be configured per cell. Index l represents an index for a closed-loop power control process, and a maximum of two processes per cell may be configured.

TS 38.101-1 and/or TS 38.101-2. In addition, $M_{RB,b,f,c}^{PUCCH}(i)$ may represent a bandwidth of PUCCH resource allocation expressed by the number of resource blocks (RBs) for a PUCCH transmission occasion based on subcarrier spacing (p). In addition, a delta function (e.g., $\Delta_{F\_PUCCH}(F)$, $\Delta_{TF,b,f,c}(i)$) may be configured in consideration of a PUCCH format (e.g., PUCCH formats 0, 1, 2, 3, 4, etc.). In addition, $g_{b,f,c}(i, l)$ related to a PUCCH power control adjustment state may be configured or indicated based on a TPC command field of DCI (e.g., DCI format 1_0, DCI format 1_1, DCI format 2_2, etc.) received or detected by a terminal.

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a linkage between a PUCCH resource (PUCCH resource) and the above-described indexes q_u, q_d, and l. As an example, a PUCCH spatial relation Activation/Deactivation command in MAC-CE may activate or deactivate a linkage between a PUCCH resource and the above-described indexes q_u, q_d, and l based on the RRC parameter PUCCH-SpatialRelationInfo. In other words, the above-described indexes q_u, q_d, l, etc. may be associated with a beam, a panel, and/or a spatial domain transmission filter based on specific information. Through this, PUCCH transmission power control in units of beams, panels, and/or spatial domain transmission filters may be performed.

The above-described parameters and/or information for PUCCH power control may be individually (i.e., independently) configured for each BWP. In this case, corresponding parameters and/or information may be configured or indicated through higher layer signaling (e.g., RRC signaling, MAC-CE, etc.) and/or DCI. As an example, parameters and/or information for PUCCH power control may be transmitted through RRC signaling PUCCH-ConfigCommon, PUCCH-PowerControl, etc., and PUCCH-CopnfigCommon and PUCCH-PowerControl may be configured as shown in Table 7 below.

TABLE 7

```
PUCCH-ConfigCommon ::=            SEQUENCE {
   pucch-ResourceCommon              INTEGER (0..15)
   pucch-GroupHopping                ENUMERATED { neither, enable, disable },
   hoppingId                         INTEGER (0..1023)
   p0-nominal                        INTEGER (-202..24)
   ...
}
PUCCH-PowerControl ::=            SEQUENCE {
   deltaF-PUCCH-f0                   INTEGER (-16..15)
   deltaF-PUCCH-f1                   INTEGER (-16..15)
   deltaF-PUCCH-f2                   INTEGER (-16..15)
   deltaF-PUCCH-f3                   INTEGER (-16..15)
   deltaF-PUCCH-f4                   INTEGER (-16..15)
   p0-Set                            SEQUENCE (SIZE (1..maxNrofPUCCH-P0-PerSet)) OF P0-PUCCH
   pathlossReferenceRSs                 SEQUENCE (SIZE (1..maxNrofPUCCH-PathlossReferenceRSs))
OF PUCCH-PathlossReferenceRS
   twoPUCCH-PC-Adjustment States     ENUMERATED {twoStates}
   ...
}
P0-PUCCH ::=                      SEQUENCE {
   p0-PUCCH-Id                       P0-PUCCH-Id,
   p0-PUCCH-Value                    INTEGER (-16..15)
}
P0-PUCCH-Id ::=                   INTEGER (1..8)
PUCCH-PathlossReferenceRS ::=        SEQUENCE {
   pucch-PathlossReferenceRS-Id         PUCCH-PathlossReferenceRS-Id,
   referenceSignal                      CHOICE {
      ssb-Index                            SSB-Index,
      csi-RS-Index                         NZP-CSI-RS-ResourceId
   }
}
```

Through the method as described above, a terminal may determine or calculate PUCCH transmission power, and may transmit a PUCCH using the determined or calculated PUCCH transmission power.

With respect to sounding reference signal (SRS) transmission in an activated UL BWP of a carrier f of a serving cell c, a terminal may calculate a linear power value of transmission power determined by Equation 5 below. Thereafter, a terminal may control transmission power by equally dividing the calculated linear power value for antenna port(s) configured for an SRS.

Specifically, by using an SRS power control adjustment state based on index 1, when a terminal performs SRS transmission in an activated UL BWP (b) of a carrier (f) of a serving cell (c), the terminal may determine SRS transmission power $P_{SRS,b,f,c}(i, q_s, l)$ (dBm) at an SRS transmission occasion (i) based on Equation 5 below.

$$P_{SRS,b,f,c}(i, q_s, l) = \min \begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix}$$

[Equation 3]

In Equation 5, q s represents an index for an open-loop power control parameter (e.g., $P_o$, α (alpha), a DL RS resource for a path loss (PL) measurement (e.g. $PL_{b,f,c}(q_d)$, etc.), and may be configured for each SRS resource set. Index 1 represents an index for a closed-loop power control process, and the corresponding index may be configured independently of a PUSCH or configured in association with a PUSCH. When SRS power control is not associated with a PUSCH, the maximum number of closed-loop power control processes for an SRS may be one.

Specifically, $P_o$ (e.g., $P_{O\_SRS,b,f,c}(q_s)$) is a parameter broadcast as part of system information, and may represent a target reception power at a receiving side. The corresponding $P_o$ value may be configured in consideration of a throughput of a terminal, capacity of a cell, noise and/or interference, etc. In addition, alpha (e.g., $\alpha_{SRS,b,f,c}(q_s)$) may represent a rate at which compensation for path loss is performed. Alpha may be configured to a value from 0 to 1, and full pathloss compensation or fractional pathloss compensation may be performed according to the configured value. In this case, the alpha value may be configured in consideration of interference between terminals and/or data rate. Also, $P_{CMAX,f,c}(i)$ may represent the configured terminal transmission power. For example, the configured terminal transmission power may be interpreted as 'configured maximum UE output power' defined in 3GPP TS 38.101-1 and/or TS 38.101-2. In addition, $M_{SRS,b,f,c}(i)$ may represent a bandwidth of SRS resource allocation expressed by the number of resource blocks (RBs) for an SRS transmission occasion based on subcarrier spacing (p). In addition, $h_{b,f,c}(i, l)$ related to an SRS power control adjustment state may be configured or indicated based on a TPC command field of a DCI (e.g., DCI format 2_3, etc.) received or detected by a terminal and/or RRC parameter (e.g., srs-PowerControlAdjustmentStates, etc.).

A resource for SRS transmission may be applied as a reference for a base station and/or a terminal to determine a beam, a panel, and/or a spatial domain transmission filter, etc., and in consideration of this, SRS transmission power control may be performed in units of beams, panels, and/or spatial domain transmission filters.

The above-described parameters and/or information for SRS power control may be individually (i.e., independently)

configured for each BWP. In this case, corresponding parameters and/or information may be configured or indicated through higher layer signaling (e.g., RRC signaling, MAC-CE, etc.) and/or DCI. As an example, parameters and/or information for SRS power control may be delivered through RRC signaling SRS-Config, SRS-TPC-Command-Config, etc., and SRS-Config and SRS-TPC-CommandConfig may be configured as shown in Table 8 below.

TABLE 8

| | |
|---|---|
| SRS-Config ::= | SEQUENCE { |
| srs-ResourceSetToReleaseList | SEQUENCE (SIZE(1..maxNrofSRS-ResourceSets)) OF SRS-ResourceSetId |
| srs-ResourceSetToAddModList | SEQUENCE (SIZE(1..maxNrofSRS-ResourceSets)) OF SRS-ResourceSet |
| srs-ResourceToReleaseList | SEQUENCE (SIZE(1..maxNrofSRS-Resources)) OF SRS-ResourceId |
| srs-ResourceToAddModList | SEQUENCE (SIZE(1..maxNrofSRS-Resources)) OF SRS-Resource |
| tpc-Accumulation | ENUMERATED {disabled} |
| ... | |
| } | |
| SRS-ResourceSet ::= | SEQUENCE { |
| srs-ResourceSetId | SRS-ResourceSetId, |
| srs-ResourceIdList | SEQUENCE (SIZE(1..maxNrofSRS-ResourcesPerSet)) OF SRS-ResourceId |
| resourceType | CHOICE { |
| aperiodic | SEQUENCE { |
| aperiodicSRS-ResourceTrigger | INTEGER (1..maxNrofSRS-TriggerStates-1), |
| csi-RS | NZP-CSI-RS-ResourceId |
| slotOffset | INTEGER (1..32) |
| ..., | |
| [[ | |
| aperiodicSRS-ResourceTriggerList-v1530 | SEQUENCE (SIZE(1..maxNrofSRS-TriggerStates-2)) |
| | OF INTEGER (1..maxNrofSRS-TriggerStates-1) |
| ]] | |
| }, | |
| semi-persistent | SEQUENCE { |
| associatedCSI-RS | NZP-CSI-RS-ResourceId |
| ... | |
| }, | |
| periodic | SEQUENCE { |
| associatedCSI-RS | NZP-CSI-RS-ResourceId |
| ... | |
| } | |
| }, | |
| usage | ENUMERATED {beamManagement, codebook, nonCodebook, antennaSwitching}, |
| alpha | Alpha |
| p0 | INTEGER (-202..24) |
| pathlossReferenceRS | CHOICE { |
| ssb-Index | SSB-Index, |
| csi-RS-Index | NZP-CSI-RS-ResourceId |
| } | |
| srs-PowerControlAdjustmentStates | ENUMERATED { sameAsFci2, separateClosedLoop} |
| ... | |
| } | |
| SRS-TPC-CommandConfig ::= | SEQUENCE { |
| startingBitOfFormat2-3 | INTEGER (1..31) |
| fieldTypeFormat2-3 | INTEGER (0..1) |
| ..., | |
| [[ | |
| startingBitOfFormat2-3SUL-v1530 | INTEGER (1..31) |
| ]] | |
| } | |

Through the method as described above, a terminal may determine or calculate SRS transmission power, and may transmit an SRS using the determined or calculated SRS transmission power. When a terminal performs PRACH transmission in an activated UL BWP (b) of a carrier (f) of a serving cell (c), a terminal may determine PRACH transmit power $P_{PRACH,b,f,c}(i)$ (dBm) in a PRACH transmission occasion (i) based on Equation 6 below.

$$P_{PRACH,b,f,c}(i) = \min\{P_{CMAX,f,c}(i), P_{PRACH,target,f,c} + PL_{b,f,c}\}$$  [Equation 6]

In Equation 6, $P_{CMAX,f,c}(i)$ may represent the configured terminal transmission power. For example, the configured terminal transmission power may be interpreted as 'configured maximum UE output power' defined in 3GPP TS 38.101-1 and/or TS 38.101-2. In addition, $P_{PRACH,target,f,c}$ represents PRACH target reception power provided through higher layer signaling (e.g., RRC signaling, MAC-CE, etc.) for an activated UL BWP. In addition, $PL_{b,f,c}$ represents a path loss for an activated UL BWP, and may be determined based on a DL RS associated with PRACH transmission in an activated DL BWP of a serving cell (c). As an example, a terminal may determine a path loss related to PRACH transmission based on a synchronization signal (SS)/physical broadcast channel (PBCH) block associated with PRACH transmission.

The above-described parameters and/or information for PRACH power control may be individually (i.e., independently) configured for each BWP. In this case, corresponding parameters and/or information may be configured or indicated through higher layer signaling (e.g., RRC signaling, MAC-CE, etc.). As an example, parameters and/or information for PRACH power control may be transmitted through RRC signaling RACH-ConfigGeneric, etc., and RACH-ConfigGeneric may be configured as shown in Table 9 below.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna

TABLE 9

```
RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER (0..15),
    preambleReceivedTargetPower     INTEGER (-202..-60),
    preambleTransMax                ENUMERATED {n3, n4, n5, n6, n7, n8, n10, n20, n50, n100,
n200},
    powerRampingStep                ENUMERATED {dB0, dB2, dB4, dB6},
    ra-ResponseWindow               ENUMERATED {s11, s12, s14, s18, s110, s120, s140, s180},
    ...
}
```

Through the method as described above, a terminal may determine or calculate PRACH transmission power, and may transmit a PRACH using the determined or calculated PRACH transmission power.

Multi Panel Operations

'A Panel' referred to in the present disclosure may be interpreted/applied as 'a plurality of (or at least one) panels' or 'a panel group' (having similarity/a common value with regard to a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set))' (having similarity/a common value with regard to a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having similarity/a common value with regard to a specific characteristic (e.g., TA, a power control parameter, etc.)). Alternatively, 'a panel' referred to in the present disclosure may be defined as a unit for a terminal to configure a transmission/reception beam. For example, 'a transmission panel' may be defined as a unit which may generate a plurality of candidate transmission beams in one panel, but may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set))' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

(port) virtualization scheme, etc. Such a mapping process may be different according to terminal implementation. In addition, 'a panel' referred to in the present disclosure may be interpreted/applied as 'a plurality of panels' or 'a panel group' (having similarity with regard to a specific characteristic).

Hereinafter, multi panel structures will be described.

For terminal implementation in a high-frequency band, modeling terminal equipped with a plurality of panels (e.g., configured with one or a plurality of antennas) is considered (e.g., 2 bi-directional panels in 3GPP UE antenna modeling). A variety of forms may be considered for such implementation of a plurality of panels of a terminal. The after-described contents are based on a terminal which supports a plurality of panels, but they may be extended and applied to a base station which supports a plurality of panels (e.g., TRP). The after-described contents related to multi panel structures may be applied to transmission and reception of a signal and/or a channel considering multi panels described in the present disclosure.

Figure 7:
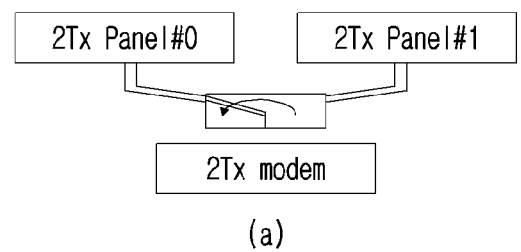
FIG. 7 is a diagram illustrating multi panel terminals in a wireless communication system to which the present disclosure may be applied.
Figure 7:
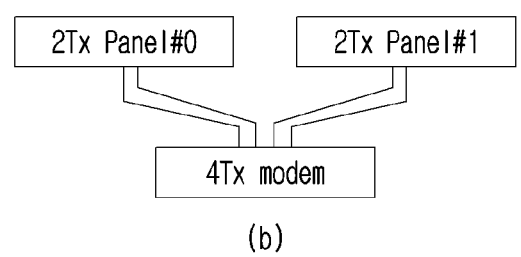

FIG. 7 is a diagram illustrating multi panel terminals in a wireless communication system to which the present disclosure may be applied.

FIG. 7(a) illustrates implementation of RF (radio frequency) switch-based multi panel terminals and FIG. 7(b) illustrates implementation of RF connection-based multi panel terminals.

For example, it may be implemented based on RF switch as in FIG. 7(a). In this case, only one panel is activated for a moment, and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(b). In this case, time for panel switching may be 0 or too little. And, it may be possible to simultaneously transmit a signal by activating a plurality of panels at the same time (STxMP: simultaneous transmission across multi-panel) according to a modem and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as a SRS resource group. For this SRS resource group, a SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(b) are considered, a corresponding concept (a SRS resource set) itself may be matched to a SRS resource group. But, a SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that four SRS resource sets (RRC parameter usage is set to 'BeamManagement') configured for BM usage are configured for a terminal. Hereinafter, for convenience, each is referred to as SRS resource set A, B, C, D. In addition, consider a situation in which a terminal implements a total of 4 (Tx) Panels and applies an implementation in which each set corresponds to one (Tx) panel to perform SRS transmission.

TABLE 10

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for UE which performs capability reporting for a value reported in feature group (FG) 2-30 as 7 or 8 in Table 10, a total of up to 4 SRS resource sets for BM (per supported time domain behavior) may be configured as in the right column of Table 10. As above, implementation which performs transmission by corresponding one UE panel to each set may be applied.

In this case, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which can be transmitted per each panel. In other words, the UE may respectively correspond 2 UL beams to 2 configured SRS resources per each panel and transmit them, when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

MPUE category 1: In a terminal that multiple panels are implemented, only one panel may be activated at a time. A delay for panel switching/activation may be configured as [X]ms. In an example, the delay may be configured to be longer than a delay for beam switching/activation and may be configured in a unit of a symbol or in a unit of a slot. MPUE category 1 may correspond to MPUE-assumption) described in standardization-related documents (e.g., a 3 gpp agreement, a technical report (TR) document and/or a technical specification (TS) document, etc.).

MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3 gpp agreement, a TR document and/or a TS document, etc.).

MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3 gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, a SRS, and/or a PRACH among activated multiple panels. The ID may be configured/defined based on at least any one of the following 4 methods (options (Alts) 1, 2, 3, 4).

Alt.1: An ID for a panel may be a SRS resource set ID.

In an example, it may be desirable to correspond each UE Tx panel to a SRS resource set configured with regard to terminal implementation when considering a) an aspect that SRS resources of multiple SRS resource sets having the same time domain behavior are simultaneously transmitted in the same BWP, b) an aspect that a power control parameter is configured in a unit of a SRS resource set, c) an aspect that a terminal may report as up to 4 SRS resource sets (they may correspond to up to 4 panels) according to a supported time domain behavior. In addition, an Alt.1 scheme has an advantage that a SRS resource set related to each panel may be used for 'codebook' and 'non-codebook'-based PUSCH transmission. In addition, for an Alt.1 scheme, multiple SRS resources belonging to multiple SRS resource sets may be selected by extending a SRI (SRS resource indicator) field of DCI. In addition, a mapping table of an SRI to an SRS resource may need to be extended to include SRS resources in the whole SRS resource set.

ii) Alt.2: An ID for a panel may be an ID which is (directly) associated with a reference RS resource and/or a reference RS resource set.

iii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., a SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to panel may be configured in a unit of a single panel or in a unit of multiple panels (e.g., a panel group, a panel set).

Sounding Reference Signal (SRS)

In Rel-15 NR, spatialRelationInfo may be used in order for a base station to indicate to a terminal a transmission beam which will be used when transmitting an UL channel. A base station may indicate which UL transmission beam will be used when transmitting a PUCCH and an SRS by configuring a DL reference signal (e.g., an SSB-RI (SB Resource Indicator), a CRI (CSI-RS Resource Indicator) (P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, a SRS for a codebook (CB) and a non-codebook (NCB) will be described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on corresponding SRS transmission and use it for PUSCH scheduling of a terminal. Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management will be described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement (BM)', only one SRS resource may be transmitted to each of a plurality of SRS resource sets in a given time instant. A terminal may be configured with one or more Sounding Reference Symbol (SRS) resource sets configured by (a higher layer parameter) 'SRS-ResourceSet' (through higher layer signaling, e.g., RRC signaling, etc.). For each SRS resource set, UE may be configured with K≥1 SRS resources (a higher layer parameter, 'SRS-resource'). Here, K is a natural number and the maximum value of K is indicated by SRS capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from UE after scheduling transmission of an SRS to UE (User Equipment) under a situation of a single cell or in multi cells (e.g., carrier aggregation (CA)) based on TDD. In this case, a base station may perform scheduling of a DL signal/channel to UE based on measurement by an SRS by assuming DL/UL reciprocity. Here, regarding SRS-based DL CSI acquisition, an SRS may be configured for antenna switching.

In an example, when following standards (e.g., 3 gpp TS38.214), usage of an SRS may be configured to a base station and/or a terminal by using a higher layer parameter (e.g., usage of a RRC parameter, SRS-ResourceSet). Here, usage of a SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL (downlink) CSI (Channel State Information) acquisition through SRS transmission under a situation such as TDD (Time Division Duplex). When antenna switching is applied, about 15 μs may be generally needed between SRS resources (and/or resources between a SRS resource and a PUSCH/a PUCCH) for antenna switching of a terminal. By considering it, (the minimum) guard period as in the following Table 11 may be defined.

TABLE 11

| μ | $\Delta f = 2^\mu \cdot 15$ [kHz] | Y [Symbol] |
|---|---|---|
| 0 | 15 | 1 |
| 1 | 30 | 1 |
| 2 | 60 | 1 |
| 3 | 120 | 2 |

In Table 11, p represents numerology, Δf represents sub-carrier spacing and Y represents the number of symbols of a guard period, i.e., a length of a guard period. In reference to Table 11, the guard period may be configured based on a parameter p which determines numerology. In the guard period, a terminal may be configured not to transmit any other signal and the guard period may be configured to be used fully for antenna switching. In an example, the guard period may be configured by considering SRS resources transmitted in the same slot. In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R', '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols. Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, a SRS port for each SRS resource in 2 given SRS resource sets may be configured to be associated with a different UE antenna port.

(Example S4) In another example, for a terminal which supports 1T1R, 2T2R, or 4T4R, up to 2 SRS resource sets respectively configured with one SRS resource may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set(s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

Path Loss (PL) Reference Signal (RS) Update Method

In NR MIMO Rel-15, in an uplink (UL channel)/RS (e.g., PUSCH, PUCCH, SRS) of a terminal, a base station may configure a DL RS (i.e., pathloss RS) by using an open loop power control parameter for pathloss compensation. In addition, only for a PUCCH, the pathloss RS may be updated by updating a PUCCH spatial relation information identifier (PUCCH-SpatialRelationInfoId) through a MAC control element (CE) message for each PUCCH resource.

Hereinafter, a PUCCH spatial relation activation/deactivation MAC CE will be described in detail.

Figure 8:
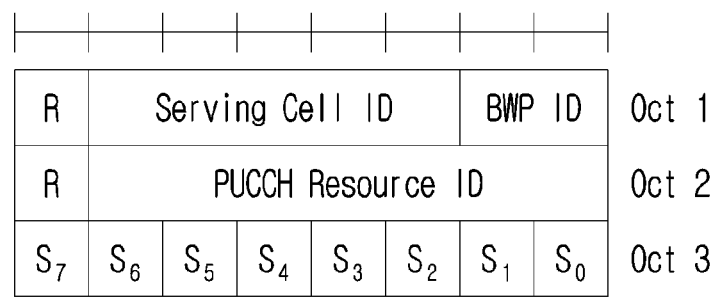
FIG. 8 is a diagram illustrating a PUCCH spatial relation activation/deactivation MAC CE in a wireless communication system to which the present disclosure may be applied.

FIG. 8 is a diagram illustrating a PUCCH spatial relation activation/deactivation MAC CE in a wireless communication system to which the present disclosure may be applied.

Referring to FIG. 8, a PUCCH spatial relation Activation/Deactivation MAC CE is identified by a MAC subheader with a logical channel identifier (LCID). In addition, a PUCCH spatial relation Activation/Deactivation MAC CE has a fixed size of 24 bits with following fields.

- Serving Cell identity (ID): This field indicates an identity of a serving cell for which the corresponding MAC CE applies. A length of this field is 5 bits;
- BWP identity (ID): This field indicates a UL BWP for which the corresponding MAC CE applies as a codepoint of a DCI bandwidth part indicator field. A length of the BWP ID field is 2 bits;
- PUCCH Resource identifier (ID): This field includes an identifier of a PUCCH resource ID identified by PUCCH-ResourceId. A length of this field is 7 bits;
- Si: If there is a PUCCH Spatial Relation Info with PUCCH-SpatialRelationInfoId, configured for an uplink BWP indicated by BWP ID field, Si indicates an activation status of PUCCH Spatial Relation Info with PUCCH-SpatialRelationInfoId equal to i+1, otherwise MAC entity ignores this field. The Si field is set to 1 to indicate that PUCCH Spatial Relation Info with PUCCH-SpatialRelationInfoId equal to i+1 is activated. The Si field is set to 0 to indicate that PUCCH Spatial Relation Info with PUCCH-SpatialRelationInfoId equal to i+1 is deactivated. Only a single PUCCH Spatial Relation Info can be active for a PUCCH Resource at a time;
- R: Reserved bit, set to 0.

Figure 9:
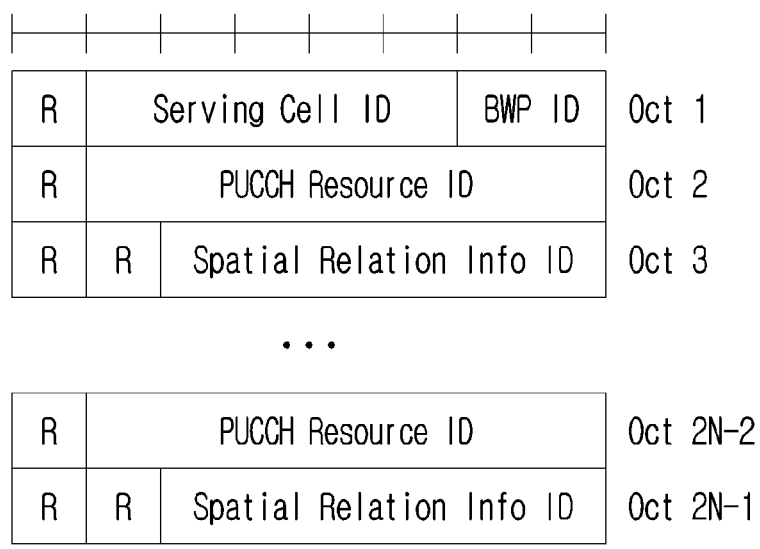
FIG. 9 is a diagram illustrating an enhanced PUCCH spatial relation activation/deactivation MAC CE in a wireless communication system to which the present disclosure may be applied.

FIG. 9 is a diagram illustrating an enhanced PUCCH spatial relation activation/deactivation MAC CE in a wireless communication system to which the present disclosure may be applied.

Referring to FIG. 9, an enhanced PUCCH spatial relation Activation/Deactivation MAC CE is identified by a MAC subheader with an enhanced (eLCID). In addition, an enhanced PUCCH spatial relation Activation/Deactivation MAC CE has a variable size with following fields.

- Serving Cell identity (ID): This field indicates an identity of a serving cell for which the corresponding MAC CE applies. A length of this field is 5 bits;
- BWP identity (ID): This field indicates a UL BWP for which the corresponding MAC CE applies as a codepoint of a DCI bandwidth part indicator field. A length of the BWP ID field is 2 bits;
- PUCCH Resource identifier (ID): This field includes an identifier of a PUCCH resource ID identified by PUCCH-ResourceId to be activated with a spatial relation indicated by Spatial relation Info ID field in a subsequent octet. A length of this field is 7 bits. If the indicated PUCCH resource is configured as a part of a PUCCH group, and other PUCCH resources in the same PUCCH group are not indicated in the corresponding MAC CE, this MAC CE is applied to all PUCCH resources in the corresponding PUCCH group;
- Spatial Relation Info identifier (ID): This field includes PUCCH-SpatialRelationInfoId-1, where PUCCH-SpatialRelationInfoId is an identifier of PUCCH spatial relationship information in PUCCH Resource ID configured in PUCCH-Config. A length of this field is 6 bits;
- R: Reserved bit, set to 0.

After that, in Rel-16 eNR MIMO, standardization was performed to update a pathloss RS for a PUSCH and a SRS through individual MAC CE messages. In addition, standardization was progressed to increase the number of pathloss RS pools configurable by RRC signaling from 8 to 64. This will be described in detail.

i) Pathloss reference RS for PUSCH can be activated/updated via a MAC CE.

The MAC CE message can activate/update the value of PUSCH-PathlossReferenceRS-Id corresponding to sri-PUSCH-PowerControlId.

In TS38.331, the mapping is given by SRI-PUSCH-PowerControl, in which the linkage is between sri-PUSCH-PowerControlId and PUSCH-PathlossReferenceRS-Id.

Reuse higher layer filtered RSRP for pathloss measurement, with defining the applicable timing after the MAC CE.

Filtered RSRP value for previous pathloss RS will be used before the application time (the next slot after the 5th measurement sample), where the 1st measurement sample corresponds to be the 1st instance (i.e., 3 ms after sending ACK for the MAC CE).

This is only applicable for UEs supporting the number of RRC-configurable pathloss RSs larger than 4, and this is only for the case that the activated PL RS by the MAC CE is not tracked.

A UE is only required to track the activated PL RS(s) if the configured PL RSs by RRC is greater than 4.

It is up to an implementation of UE whether to update the filtered RSRP value for previous PL RS 3 ms after sending ACK for the MAC CE.

ii) Pathloss reference RS for aperiodic (AP)-SRS/semi-persistent (SP)-SRS can be activated/updated via a MAC CE.

A UE can be configured with multiple pathloss RSs by RRC and one of them can be activated/updated via the MAC CE for an SRS resource set.

Reuse higher layer filtered RSRP for pathloss measurement, with defining the applicable timing after the MAC CE.

Filtered RSRP value for previous pathloss RS will be used before the application time (the next slot after the 5th measurement sample), where the 1st measurement sample corresponds to be the 1st instance (i.e., 3 ms after sending ACK for the MAC CE).

This is only applicable for UEs supporting the number of RRC-configurable pathloss RSs larger than 4, and this is only for the case that the activated PL RS by the MAC CE is not tracked.

A UE is only required to track the activated PL RS if the configured PL RSs by RRC is greater than 4.

It is up to an implementation of a UE whether to update the filtered RSRP value for previous PL RS 3 ms after sending ACK for the MAC CE.

iii) On power control for a PUSCH, a PUCCH, and an SRS, the total number of maximum configurable pathloss RSs by RRC is 64.

Such pathloss reference signals are for configuration purpose only, and a UE is still only required to track up to 4 pathloss RSs for any PUSCH, PUCCH, and SRS transmissions.

Here, "up to 4 pathloss RSs" applies the total number of pathloss RSs for a PUSCH, a PUCCH, and an SRS.

iv) For an update of a pathloss RS for a PUSCH/SRS based on a MAC CE, a new RRC parameter enablePLRSupdateForPUSCHSRS is introduced to enable MAC CE based pathloss RS update for a PUSCH/SRS.

v) When RRC parameter enablePLRSupdateForPUSCHSRS is configured,
  if a grant-based or grant-free PUSCH transmission is scheduled/activated by DCI format 0_1 that does not include a SRI field, the RS resource index $q_d$ corresponding to the PUSCH-PathlossReferenceRS-Id mapped with sri-PUSCH-PowerControlId=0 is used for path-loss measurement of a PUSCH. In this case, a UE expects to be configured with sri-PUSCH-PowerControl.

Hereinafter, an SRS Pathloss Reference RS Activation/Deactivation MAC CE (or SRS Pathloss Reference RS Update MAC CE) will be specifically described.

Figure 10:
FIG. 10 is a diagram illustrating an SRS path loss reference RS activation/deactivation MAC CE in a wireless communication system to which the present disclosure may be applied.

FIG. 10 is a diagram illustrating an SRS path loss reference RS activation/deactivation MAC CE in a wireless communication system to which the present disclosure may be applied.

Referring to FIG. 10, an SRS Pathloss Reference RS Activation/Deactivation MAC CE is identified by a MAC subheader with LCID. An SRS Pathloss Reference RS Activation/Deactivation MAC CE has a fixed size with 24 bits:
  Serving Cell identity (ID): This field indicates an identity of a serving cell, which includes an activated SRS resource set. A length of this field is 5 bits;
  BWP identity (ID): This field indicates a UL BWP as a codepoint of a DCI bandwidth part indicator field, which includes an activated SRS resource set. A length of BWP ID field is 2 bits;
  SRS Resource Set identifier (ID): This field indicates an SRS Resource Set ID identified by SRS-ResourceSetId. A length of this field is 4 bits;
  Pathloss reference RS identifier (ID): This field indicates an SRS Resource Set ID identified by pathlossReferenceRS. A length of this field is 6 bits;
  R: Reserved bit, set to 0.

Hereinafter, a PUSCH pathloss reference RS activation/deactivation MAC CE (or PUSCH pathloss reference RS update MAC CE) will be described in detail.

Figure 11:
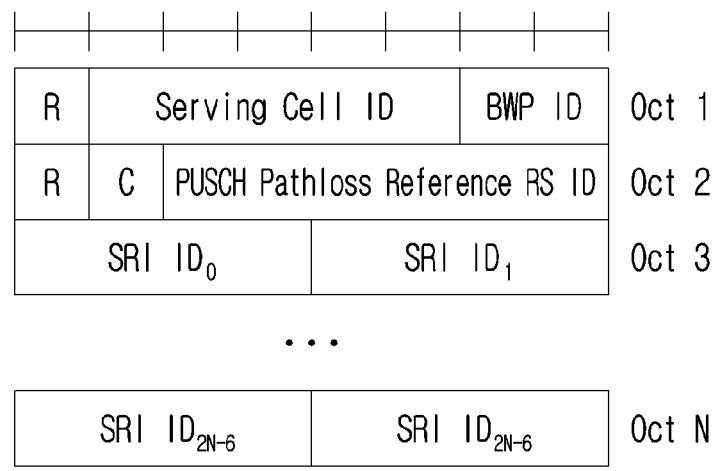
FIG. 11 is a diagram illustrating a PUSCH path loss reference RS activation/deactivation MAC CE in a wireless communication system to which the present disclosure may be applied.

FIG. 11 is a diagram illustrating a PUSCH path loss reference RS activation/deactivation MAC CE in a wireless communication system to which the present disclosure may be applied.

Referring to FIG. 11, a PUSCH Pathloss Reference RS Activation/Deactivation MAC CE is identified by a MAC subheader with an eLCID. In addition, a PUSCH Pathloss Reference RS Activation/Deactivation MAC CE has a variable size with the following fields:
  Serving Cell identity (ID): This field indicates an identity of a serving cell, which includes an activated PUSCH pathloss reference RS. A length of this field is 5 bits;
  BWP identifier (BWP ID): This field indicates a UL BWP including an activated PUSCH pathloss reference RS as a codepoint of a DCI bandwidth part indicator field. A length of the BWP ID field is 2 bits;
  PUSCH Pathloss Reference RS identifier (ID): This field indicates a PUSCH pathloss reference RS identified by PUSCH-PathlossReferenceRS-Id, and this PUSCH path loss reference RS is updated in SRI PUSCH power control mappings indicated by an SRI ID field indicated in the same MAC CE. A length of this field is 6 bits;
  C: This field indicates the presence of an additional SRI ID in the last octet of this MAC CE. If this field is set to 1, two SRI ID(s) are present in the last octet. Otherwise, only one SRI ID (i.e., the first SRI ID) is present in the last octet;
  SRI (SRS resource indicator) identifier (SRI ID): This field indicates an SRI PUSCH power control identifier (ID) identified by sri-PUSCH-PowerControlId. A length of this field is 4 bits;
  R: Reserved bit, set to 0.

In the above-described pathloss RS-related operation, the number of pathloss RSs that a terminal can track at the same time has a limit (e.g., four) according to UE capability. However, for a terminal, the number of RSs in a pathloss RS pool may be configured up to 64. Therefore, when a MAC CE message related to pathloss RS update that exceeds this limit is transmitted to a terminal, there is a problem in that ambiguity occurs in an operation of a terminal. In order to solve this problem, in the present disclosure, a method in which a base station configures and/or updates a pathloss RS, which is an open loop power control parameter of a UL channel/RS, to the terminal, and a subsequent UL channel/RS transmission method of a terminal are proposed.

A reference signal (RS) used for (or reference) pathloss estimation in this disclosure may be referred to as a pathloss RS, or a pathloss reference RS, or a pathloss estimation RS. In addition, in the description of the present disclosure, updating a path loss estimation RS resource may be interpreted as updating a path loss RS transmitted on the corresponding resource.

Proposal 1: A Method in which a Base Station Configures/Updates a Pathloss RS that is an Open Loop Power Control Parameter of a UL Channel/RS to a Terminal As described above, up to Rel-16, in the case of pathloss RS update for a specific UL channel/RS, for one of each UL channel/RS (e.g., PUCCH resource identifier (PUCCH resource ID), SRS resource set identifier (SRS resource set ID), SRI identifier (SRI ID)), spatial relation information identifier (spatialRelationInfo ID) or pathloss RS identifier (pathloss RS ID) may be updated through a single MAC CE message format.

Here, it is assumed that the number of pathloss RSs that a terminal can track simultaneously is 4 according to UE capability. In addition, it is assumed that the number of pathloss RSs activated by a terminal at any moment is three or less, and the number of pathloss RSs tracked by a terminal is also three or less. In this case, if a pathloss RS is updated to a pathloss RS that is not activated (or not being tracked) for a specific UL channel/RS, a terminal tracks 4 RSs up to the newly activated pathloss RS (from RRC pathloss RS pool) following (in addition) the 3 pathloss RSs that were being tracked. Therefore, such an operation is possible within capability of a terminal.

Alternatively, it is assumed that there are 4 pathloss RSs activated to a terminal at any moment, and 4 pathloss RSs that were being tracked. In this case, as in the example of Table 12 below, if the number of total UL channel/RS referencing the RS to be updated among the four pathloss RSs is only one (i.e., the total UL channel/RS means that there is only one target UL channel/RS), even though the RS to be tracked is changed (by a specific condition) through the pathloss RS update procedure through the MAC CE, a terminal may not exceed the UE capability limit.

In the present disclosure, a target UL channel/RS means a UL channel/RS that is a target for which a PL RS is updated by a MAC CE.

Table 12 exemplifies a case of updating a pathloss (PL) RS of PUCCH resource 3 through a MAC CE message.

TABLE 12

| Before PL RS update | After PL RS update |
| --- | --- |
| PL RS 1: PUCCH resource 1 and 2 refer | PL RS 1: PUCCH resource 1 and 2 refer |
| PL RS 2: SRI 1 and 2 refer | PL RS 2: SRI 1 and 2 refer |
| PL RS 3: SRI 3 and SRS resource sets 1 and 2 refer | PL RS 3: SRI 3 and SRS resource sets 1 and 2 refer |
| PL RS 4: PUCCH resource 3 refers | PL RS 5: PUCCH resource 3 refers (Considering applicable timing, a pathloss RS of PUCCH resource 3 tracked by a terminal is transitioned from PL RS 4 to PL RS 5, and the number of pathloss RSs that a terminal tracks simultaneously is also maintained at 4.) |

As shown in Table 12, before the PL RS update, PL RS 4 is referenced only by PUCCH resource 3. That is, a UL channel/RS referring to the RS to be updated (PL RS 4 in the example of Table 12 above) is one target UL channel/RS (PUCCH resource 3 in the example of Table 12 above). Therefore, even if the PL RS of PUCCH resource 3 is updated (or changed) to PL RS 5, the number of PL RSs simultaneously tracked by a terminal is maintained at four.

In the example of Table 12 above, for convenience of explanation, it is assumed that the number of PL RSs that can be simultaneously tracked according to the capability of a terminal is 4, but the number of PL RSs is not limited to 4. That is, the above example illustrates a situation in which even if the PL RS of PUCCH resource 3 is updated (or changed) to PL RS 5, the number of PL RSs simultaneously tracking of a terminal does not out of (exceed) the capability of a terminal.

However, as in the example of Table 13 below, when the number of total UL channel/RS referencing the RS to be updated among the four pathloss RSs is 2 or more (i.e., the total UL channel/RS includes one or more UL channels/RSs other than the target UL channel/RS), a situation may occur in which the number of pathloss RSs to be simultaneously tracked by a terminal exceeds the limit of 4 temporarily, which may cause ambiguity in an operation of a terminal.

Table 13 exemplifies a case of updating a pathloss (PL) RS of PUCCH resource 3 through a MAC CE message.

TABLE 13

| Before PL RS update | After PL RS update |
| --- | --- |
| PL RS 1: PUCCH resource 1 and 2 refer | PL RS 1: PUCCH resource 1 and 2 refer |
| PL RS 2: SRI 1 and 2 refer | PL RS 2: SRI 1 and 2 refer |
| PL RS 3: SRI 3 and SRS resource sets 1 and 2 refer | PL RS 3: SRI 3 and SRS resource sets 1 and 2 refer |
| PL RS 4: PUCCH resource 3 and 4 refer | PL RS 4: PUCCH resource 4 refers |
| | PL RS 5: PUCCH resource 3 refers (Since the pathloss RS of PUCCH resource 3 is updated from PL RS 4 to PL RS 5, a terminal should simultaneously track 5 PL RSs that are above the limit.) |

As shown in Table 13, PL RS 4 is referenced by PUCCH resource 3 and PUCCH resource 4. That is, the number of total UL channels/RSs referencing the RS to be updated is 2 or more. Here, as the PL RS of PUCCH resource 3, which is the target UL channel, is updated to PL RS 5, the number of PL RSs that a terminal needs to track increases by one more. Accordingly, the number of PL RSs that a terminal should simultaneously track exceeds the maximum limit (4) of the terminal.

In the example of Table 13 above, for convenience of description, it is assumed that the number of PL RSs that can be simultaneously tracked according to the capability of the terminal is 4, but the number of PL RSs is not limited to 4. That is, in the above example, as the PL RS of PUCCH resource 3 is updated (or changed) to PL RS 5, the number of PL RSs simultaneously tracked by a terminal is out of (exceeds) the capability of the terminal.

In proposal 1, in order to solve the above problem, a method of updating a pathloss RS of a UL channel/RS of a terminal through a MAC CE divided into option 1 and option 2 as follows, and here, an operation between a base station and a terminal are proposed.

Option 1) The number of pathloss RSs that have been activated to a terminal (or that a terminal is tracking) is the same as the number of pathloss RSs that a terminal can track simultaneously (i.e., terminal capability, e.g., 4 as a terminal capability):

Option 1-1) When performing pathloss RS update for a specific target UL channel/RS through a MAC CE message, if updating to a previously activated pathloss RS:

In this case, since the number of pathloss RSs that a terminal can track simultaneously is not exceeded, a terminal may perform pathloss RS update on the target UL channel/RS as in the existing operation.

That is, since a pathloss RS for a target UL channel/RS is updated (changed) to an already activated (i.e., being tracked) pathloss RS (i.e., pathloss RS referenced by a UL channel/RS other than the target UL channel/RS), even though a pathloss RS for the target UL channel/RS is updated (changed), the total number of activated (that is, being tracked) pathloss RS does not change.

Option 1-2-1) i) When performing pathloss RS update for a specific target UL channel/RS through a MAC CE message, if updating to a pathloss RS (in an RRC pathloss RS pool (up to 64)) other than a previously activated pathloss RS, and ii) for the previously activated pathloss RS referenced by the target UL channel/RS to be updated, when the number of total UL channel/RS referencing the corresponding pathloss RS is one (i.e., when a UL channel/RS referencing the pathloss RS to be updated is only one target UL channel/RS):

As shown in Table 12 above, even though a pathloss RS to be updated is updated to a new pathloss RS, the number of pathloss RSs that a terminal can track simultaneously does not exceed. Accordingly, a terminal may perform pathloss RS update on the target UL channel/RS according to the terminal operation in Rel-16 (according to a specific condition).

That is, since there is no other UL channel/RS referring to the pathloss RS for the target UL channel/RS, even if the pathloss RS for the target UL channel/RS is updated (changed), the total number of activated (i.e., being tracked) pathloss RSs remains the same.

Option 1-2-2) i) When performing pathloss RS update for a specific target UL channel/RS through a MAC CE message, if updating to a pathloss RS (in an RRC pathloss RS pool (up to 64)) other than a previously activated pathloss RS, and ii) for the previously activated pathloss RS referenced by the target UL channel/RS to be updated, when the number of total UL channel/RS referencing the corresponding pathloss RS is 2 or more (i.e., when there are multiple UL channels/RSs referencing the pathloss RS to be updated, including the target UL channel/RS):

According to the existing operation, as shown in Table 13 above, the number of pathloss RSs that a terminal needs to track increases, therefore the number of pathloss RSs that the terminal can track simultaneously is exceeded.

To prevent this, for all UL channel/RS referencing the pathloss RS to update, a terminal may perform a batch pathloss RS update to the pathloss RS (other than the previously activated pathloss RS) indicated as the update target through a corresponding MAC CE message. That is, pathloss RS update of multiple UL channels/RSs (including target UL channel/RS) may be performed through a single MAC CE message.

In the case of Table 13 above, for example, a terminal may change not only the PL RS of PUCCH resource 3, which is the target UL channel, but also the PL RS of PUCCH resource 4 to PL RS 5 indicated through a MAC CE message. In this case, since PL RSs that a terminal needs to track simultaneously are PL RS 1, PL RS 2, PL RS 3 and PL RS 5, the maximum limit value (4) is not exceeded.

Option 2) The number of pathloss RSs that have been activated to a terminal (or that a terminal is tracking) is less than the number of pathloss RSs (i.e., a terminal capability, for example, 4 as a terminal capability) that a terminal can track simultaneously:

Option 2-1) When performing pathloss RS update for a specific target UL channel/RS through a MAC CE message, if updating to a previously activated pathloss RS:

In this case, since the number of pathloss RSs that a terminal can track simultaneously is not exceeded, a terminal may perform pathloss RS update on the target UL channel/RS as in the existing operation.

That is, since a pathloss RS for a target UL channel/RS is updated (changed) to an already activated (i.e., being tracked) pathloss RS (i.e., pathloss RS referenced by a UL channel/RS other than the target UL channel/RS), even though a pathloss RS for the target UL channel/RS is updated (changed), the total number of activated (that is, being tracked) pathloss RS does not change.

Option 2-2-1) i) When performing pathloss RS update for a specific target UL channel/RS through a MAC CE message, if updating to a pathloss RS (in an RRC pathloss RS pool (up to 64)) other than a previously activated pathloss RS:

In this case, since the number of pathloss RSs that a terminal can track simultaneously is not exceeded, a terminal may perform pathloss RS update on the target UL channel/RS as in the existing operation.

Option 2-2-2) i) When performing pathloss RS update for a specific target UL channel/RS through a MAC CE message, if updating to a pathloss RS (in an RRC pathloss RS pool (up to 64)) other than a previously activated pathloss RS:

For consistency of terminal operation, for all UL channels/RSs that refer to the pathloss RS to be updated as in the above-mentioned option 1-2-2, a terminal may perform a batch pathloss RS update to the pathloss RS (other than the previously activated pathloss RS) for which the update is indicated through a corresponding MAC CE message. That is, pathloss RS update of multiple UL channels/RSs (including target UL channel/RS) may be performed through a single MAC CE message.

Although the above-described operation describes a pathloss RS update of a UL channel/RS through a MAC CE message for convenience of description, the present disclosure is not limited thereto. That is, the above-described operation may be equally applied when updating a pathloss RS of a terminal-specific UL channel/RS through an RRC configuration (or DCI).

Through the operation of the above-mentioned proposal 1, a terminal does not exceed the number of pathloss RSs that the terminal can track simultaneously in any configuration/indication/update of a base station, so ambiguity of a terminal operation can be solved.

Figure 12:
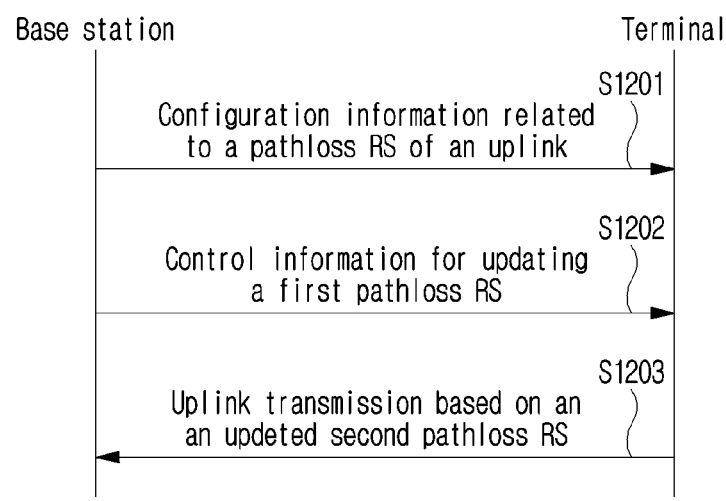
FIG. 12 is a diagram illustrating a signaling procedure between a base station and a terminal for a method of transmitting and receiving an uplink according to an embodiment of the present disclosure.

FIG. 12 is a diagram illustrating a signaling procedure between a base station and a terminal for a method of transmitting and receiving an uplink according to an embodiment of the present disclosure.

FIG. 12 illustrates a signaling procedure based on the previously proposed proposal 1. The example of FIG. 12 is for convenience of description, and does not limit the scope of the present disclosure. Some step(s) illustrated in FIG. 12 may be omitted depending on circumstances and/or settings. In addition, a base station and a terminal in FIG. 12 are only one example, and may be implemented with an apparatus illustrated in FIGS. 14 and 15 below. For example, the processor 102/202 of FIG. 14 may control to transmit/receive a channel/signal/data/information, etc. (e.g., RRC signaling, MAC CE, DCI for UL/DL scheduling, SRS, PDCCH, PDSCH, PUSCH, PUCCH, PHICH, etc.) using the transceiver 106/206, and may control to store transmitted or received channel/signal/data/information, etc. in the memory 104/204.

Referring to FIG. 12, a base station (BS) may transmit configuration information related to a pathloss (PL) RS of an uplink (i.e., an uplink channel and/or signal) to a user equipment (UE) (S1201).

That is, a terminal may receive configuration information related to a pathloss RS of an uplink (i.e., uplink channel and/or signal) from a base station.

Here, configuration information may include information on one or more pathloss (PL) RSs related to an uplink (i.e., uplink channel and/or signal).

Here, configuration information is information on one or more (e.g., 64) pathloss RSs used for PUCCH pathloss estimation (e.g., pathloss RS identifier, SSB index or CSI-RS resource identifier used as pathloss RS, etc.).

In addition, configuration information is information on one or more (e.g., 64) pathloss RSs used for PUSCH pathloss estimation (e.g., pathloss RS identifier, SSB index or CSI-RS resource identifier used as pathloss RS, etc.).

In addition, configuration information is information on one or more (e.g., 64) pathloss RS used for SRS pathloss estimation (e.g., pathloss RS identifier, SSB index or CSI-RS resource identifier used as pathloss RS, etc.).

A base station may transmit control information (e.g., RRC signaling, MAC CE, DCI) for updating a pathloss RS (a first pathloss RS) to a UE (S1202).

That is, a terminal may receive control information (e.g., RRC signaling, MAC CE, DCI) for updating a pathloss RS (a first pathloss RS) from a base station.

Here, control information may include information related to an activation and a deactivation of a spatial relation for a PUCCH resource. For example, control information may correspond to a PUCCH spatial relation activation/deactivation MAC CE (refer to FIGS. 8 and/or 9). In this case, control information may include a PUCCH resource identifier (PUCCH Resource ID) and a spatial relation information identifier (Spatial Relation Info ID). A PUCCH resource identified by the PUCCH Resource ID may be activated with a spatial relation indicated by the Spatial Relation Info ID.

In addition, control information may include information related to an activation and an update of a pathloss RS of an SRS. For example, control information may correspond to SRS Pathloss Reference RS Update MAC CE (refer to FIG. 10). In this case, control information may include an SRS resource set identifier (SRS resource set ID) and a pathloss reference RS identifier (pathloss reference RS ID). A pathloss reference RS for an SRS resource set identified by the SRS resource set ID may be updated to a pathloss reference RS identified by the Pathloss reference RS ID.

In addition, control information may include information related to an activation and an update of a path loss reference signal of a PUSCH. For example, control information may correspond to PUSCH pathloss reference RS update MAC CE (refer to FIG. 11). In this case, control information may include an SRI identifier (SRI ID) and a PUSCH pathloss reference RS identifier (PUSCH Pathloss reference RS ID). A pathloss reference RS in an SRI PUSCH power control mapping indicated by the SRI ID may be updated to a pathloss reference RS identified by the PUSCH Pathloss reference RS ID.

A terminal may transmit an uplink (i.e., uplink channel and/or signal) to a base station based on an updated pathloss RS (a second pathloss RS) (S1203).

That is, a base station may receive an uplink (i.e., an uplink channel and/or a signal) from a terminal, and here an uplink may be transmitted based on an updated pathloss RS (a second pathloss RS).

Here, as in the above-mentioned proposal 1, pathloss RSs for all uplinks referring to a first pathloss RS may be updated to a second pathloss RS. In other words, even though the control information is control information for a specific uplink, pathloss RSs for all uplinks including the specific uplink referring to the first pathloss RS may be updated to the second pathloss RS.

In addition, when all pathloss RSs previously activated for the terminal are equal to the maximum number according to the capability of the terminal, pathloss RSs for all uplinks referring to a first pathloss RS may be updated to a second pathloss RS. In addition, even though all PL RSs previously activated for the terminal are less than the maximum number according to the capability of the terminal, pathloss RSs for all uplinks referring to the first pathloss RS may be updated to the second pathloss RS.

In addition, if the control information indicates to be updated to a pathloss RS other than all pathloss RSs previously activated for the terminal, pathloss RSs for all uplinks referring to the first pathloss RS may be updated to the second pathloss RS.

A terminal may estimate a pathloss value based on an updated second pathloss RS, and determine uplink transmission power (i.e., uplink channel and/or signal) based on the estimated pathloss value.

Specifically, here, if a pathloss RS is updated by the MAC CE, a terminal may apply a pathloss estimation based on an updated pathloss RS starting from a specific slot. That is, a terminal may estimate a pathloss value based on an updated pathloss RS, and determine PUSCH/PUCCH/SRS transmission power based on the estimated pathloss value. Here, the specific slot may correspond to the first slot after a predetermined number of slots from the slot in which a terminal transmits a PUCCH or a PUSCH with a HARQ-ACK for a PDSCH providing the MAC CE (i.e., MAC CE for pathloss RS update).

Figure 13:
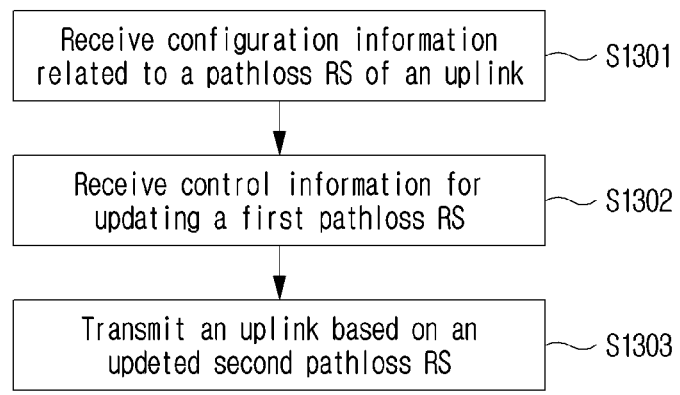
FIG. 13 is a diagram illustrating an operation of a terminal in a method of transmitting and receiving an uplink according to an embodiment of the present disclosure.

FIG. 13 is a diagram illustrating an operation of a terminal in a method of transmitting and receiving an uplink according to an embodiment of the present disclosure.

FIG. 13 illustrates an operation of a terminal based on the previously proposed proposal 1. The example of FIG. 13 is for convenience of description, and does not limit the scope of the present disclosure. Some step(s) illustrated in FIG. 13 may be omitted depending on circumstances and/or settings. In addition, a terminal in FIG. 13 are only one example, and may be implemented with an apparatus illustrated in FIGS. 14 and 15 below. For example, the processor 102/202 of FIG. 14 may control to transmit/receive a channel/signal/data/information, etc. (e.g., RRC signaling, MAC CE, DCI for UL/DL scheduling, SRS, PDCCH, PDSCH, PUSCH, PUCCH, PHICH, etc.) using the transceiver 106/206, and may control to store transmitted or received channel/signal/data/information, etc. in the memory 104/204.

Referring to FIG. 13, a terminal may receive configuration information related to a pathloss RS of an uplink (i.e., uplink channel and/or signal) from a base station (S1301).

Here, configuration information may include information on one or more pathloss (PL) RSs related to an uplink (i.e., uplink channel and/or signal).

Here, configuration information is information on one or more (e.g., 64) pathloss RSs used for PUCCH pathloss estimation (e.g., pathloss RS identifier, SSB index or CSI-RS resource identifier used as pathloss RS, etc.).

In addition, configuration information is information on one or more (e.g., 64) pathloss RSs used for PUSCH pathloss estimation (e.g., pathloss RS identifier, SSB index or CSI-RS resource identifier used as pathloss RS, etc.).

In addition, configuration information is information on one or more (e.g., 64) pathloss RS used for SRS pathloss estimation (e.g., pathloss RS identifier, SSB index or CSI-RS resource identifier used as pathloss RS, etc.).

A terminal may receive control information (e.g., RRC signaling, MAC CE, DCI) for updating a pathloss RS (a first pathloss RS) from a base station (S1302).

Here, control information may include information related to an activation and a deactivation of a spatial relation for a PUCCH resource. For example, control information may correspond to a PUCCH spatial relation activation/deactivation MAC CE (refer to FIGS. 8 and/or 9). In this case, control information may include a PUCCH resource identifier (PUCCH Resource ID) and a spatial relation information identifier (Spatial Relation Info ID). A PUCCH resource identified by the PUCCH Resource ID may be activated with a spatial relation indicated by the Spatial Relation Info ID.

In addition, control information may include information related to an activation and an update of a pathloss RS of an SRS. For example, control information may correspond to SRS Pathloss Reference RS Update MAC CE (refer to FIG. 10). In this case, control information may include an SRS resource set identifier (SRS resource set ID) and a pathloss reference RS identifier (pathloss reference RS ID). A pathloss reference RS for an SRS resource set identified by the SRS resource set ID may be updated to a pathloss reference RS identified by the Pathloss reference RS ID.

In addition, control information may include information related to an activation and an update of a path loss reference signal of a PUSCH. For example, control information may correspond to PUSCH pathloss reference RS update MAC CE (refer to FIG. 11). In this case, control information may include an SRI identifier (SRI ID) and a PUSCH pathloss reference RS identifier (PUSCH Pathloss reference RS ID). A pathloss reference RS in an SRI PUSCH power control mapping indicated by the SRI ID may be updated to a pathloss reference RS identified by the PUSCH Pathloss reference RS ID.

A terminal may transmit an uplink (i.e., uplink channel and/or signal) to a base station based on an updated pathloss RS (a second pathloss RS) (S1303).

Here, as in the above-mentioned proposal 1, pathloss RSs for all uplinks referring to a first pathloss RS may be updated to a second pathloss RS. In other words, even though the control information is control information for a specific uplink, pathloss RSs for all uplinks including the specific uplink referring to the first pathloss RS may be updated to the second pathloss RS.

In addition, when all pathloss RSs previously activated for the terminal are equal to the maximum number according to the capability of the terminal, pathloss RSs for all uplinks referring to a first pathloss RS may be updated to a second pathloss RS. In addition, even though all PL RSs previously activated for the terminal are less than the maximum number according to the capability of the terminal, pathloss RSs for all uplinks referring to the first pathloss RS may be updated to the second pathloss RS.

In addition, if the control information indicates to be updated to a pathloss RS other than all pathloss RSs previously activated for the terminal, pathloss RSs for all uplinks referring to the first pathloss RS may be updated to the second pathloss RS.

A terminal may estimate a pathloss value based on an updated second pathloss RS, and determine uplink transmission power (i.e., uplink channel and/or signal) based on the estimated pathloss value.

Specifically, here, if a pathloss RS is updated by the MAC CE, a terminal may apply a pathloss estimation based on an updated pathloss RS starting from a specific slot. That is, a terminal may estimate a pathloss value based on an updated pathloss RS, and determine PUSCH/PUCCH/SRS transmission power based on the estimated pathloss value. Here, the specific slot may correspond to the first slot after a predetermined number of slots from the slot in which a terminal transmits a PUCCH or a PUSCH with a HARQ-ACK for a PDSCH providing the MAC CE (i.e., MAC CE for pathloss RS update).

General Device to which the Present Disclosure May be Applied

Figure 14:
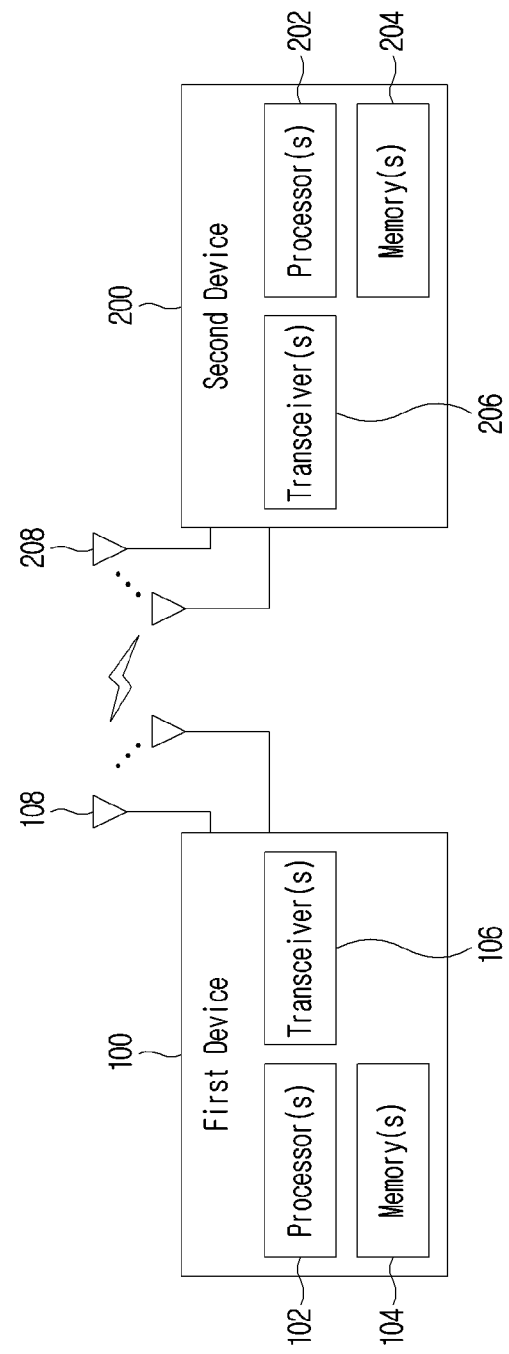
FIG. 14 illustrates a block diagram of a wireless communication device according to an embodiment of the present disclosure.

FIG. 14 is a diagram which illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Figure 15:
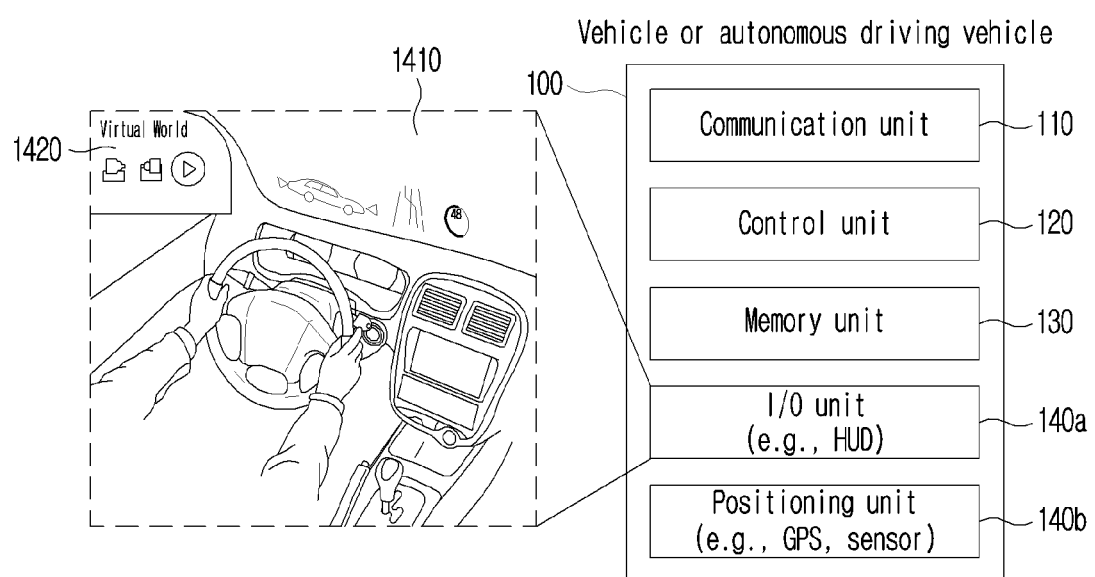
FIG. 15 illustrates a vehicle device according to an embodiment of the present disclosure.

FIG. 15 illustrates a vehicle device according to an embodiment of the present disclosure.

In reference to FIG. 15, a vehicle 100 may include a communication unit 110, a control unit 120, a memory unit 130, an input and output unit 140a and a positioning unit 140b.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140a may output an AR/VR object based on information in a memory unit 130. An input and output unit 140a may include HUD. A positioning unit 140b may obtain position information of a vehicle 100. Position information may include absolute position information, position information in a driving lane, acceleration information, position information with a surrounding vehicle, etc. of a vehicle 100. A positioning unit 140b may include a GPS and a variety of sensors.

In an example, a communication unit 110 of a vehicle 100 may receive map information, traffic information, etc. from an external server and store them in a memory unit 130. A positioning unit 140b may obtain vehicle position information through a GPS and a variety of sensors and store it in a memory unit 130. A control unit 120 may generate a virtual object based on map information, traffic information and vehicle position information, etc. and an input and output unit 140*a* may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140*a*. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a terminal, from a base station, configuration information related to a plurality of reference signals for estimating pathloss;
receiving, by the terminal, from the base station, control information for updating a first reference signal for a specific target uplink channel or signal to a second reference signal, wherein the first reference signal and the second reference signal belong to the plurality of reference signals, the first reference signal is referenced by multiple uplink channels or signals, and the multiple uplink channels or signals include the specific target uplink channel or signal;
based on the second reference signal being not an activated reference signal for the terminal, updating the first reference signal for the multiple uplink channels or signals to the second reference signal; and
transmitting, to the base station, an uplink the multiple uplink channels or signals based on the second reference signal.

2. The method of claim 1, wherein, based on all reference signals previously activated for the terminal being equal to a maximum number according to capability of the terminal, the first reference signal for the multiple uplink channels or signals are updated to the second reference signal.

3. The method of claim 1, wherein, based on all reference signals previously activated for the terminal being less than a maximum number according to capability of the terminal, the first reference signal for the multiple uplink channels or signals are updated to the second reference signal.

4. The method of claim 1, wherein uplink transmission power is determined based on a pathloss value estimated based on the second reference signal.

5. A terminal comprising:
- at least one transceiver for transmitting and receiving a wireless signal; and
- at least one processor for controlling the at least one transceiver,
- wherein the at least one processor configured to:
- receive, from a base station, configuration information related to a plurality of reference signals for estimating pathloss;
- receive, from the base station, control information for updating a first reference signal for a specific target uplink channel or signal to a second reference signal, wherein the first reference signal and the second reference signal belong to the plurality of reference signals, the first reference signal is referenced by multiple uplink channels or signals, and the multiple uplink channels or signals include the specific target uplink channel or signal;
- based on the second reference signal being not an activated reference signal for the terminal, updating the first reference signal for the multiple uplink channels or signals to the second reference signal; and
- transmit, to the base station, the multiple uplink channels or signals based on the second reference signal.

6. The terminal of claim 5, wherein, based on all reference signals previously activated for the terminal being equal to a maximum number according to capability of the terminal, the first reference signal for the multiple uplink channels or signals are updated to the second reference signal.

7. The terminal of claim 5, wherein, based on all reference signals previously activated for the terminal being less than a maximum number according to capability of the terminal, the first reference signal for the multiple uplink channels or signals are updated to the second reference signal.

8. The terminal of claim 5, wherein uplink transmission power is determined based on a pathloss value estimated based on the second reference signal.

9. At least one non-transitory computer-readable medium storing at least one instruction, wherein the at least one instruction executable by at least one processor controls a device to:
- receive, from a base station, configuration information related to a plurality of reference signals for estimating pathloss;
- receive, from the base station, control information for updating a first reference signal for a specific target uplink channel or signal to a second reference signal, wherein the first reference signal and the second reference signal belong to the plurality of reference signals, the first reference signal is referenced by multiple uplink channels or signals, and the multiple uplink channels or signals include the specific target uplink channel or signal;
- based on the second reference signal being not an activated reference signal for the device, updating the first reference signal for the multiple uplink channels or signals to the second reference signal; and
- transmit, to the base station, the multiple uplink channels or signals based on the second reference signal.

* * * * *